United States Patent
Morgan et al.

[15] 3,697,752
[45] Oct. 10, 1972

[54] PROBE FOR LOCATING SPECIFIC ELEMENTS IN A BOREHOLE

[72] Inventors: Ira Lon Morgan; John R. Rhodes, both of Austin, Tex.

[73] Assignee: Nuclear-Chicago Corporation, Des Plaines, Ill.

[22] Filed: April 1, 1969

[21] Appl. No.: 811,995

[52] U.S. Cl. .................................................. 250/71.5 R
[51] Int. Cl. ........................................................ G01t 1/20
[58] Field of Search ............... 250/71.5, 83.6 W, 51.5

[56] References Cited

UNITED STATES PATENTS

| | | | |
|---|---|---|---|
| 2,923,824 | 2/1960 | Martin et al. | 250/71.5 X |
| 3,100,261 | 8/1963 | Bigelow | 250/83.6 X |
| 3,240,938 | 3/1966 | Hall, Jr. | 250/83.6 X |
| 3,316,406 | 4/1967 | Sauerwein et al. | 250/106 |

*Primary Examiner*—James W. Lawrence
*Assistant Examiner*—Davis L. Willis
*Attorney*—Mason, Kolehmainen, Rathburn & Wyss

[57] ABSTRACT

A borehole logging system which is able to identify specific elements by means of X-ray fluorescent analysis. The logging probe comprises a pair of symmetrical source and shield assemblies symmetrically mounted between two scintillation detectors. The detector outputs are fed into a field-effect transistor differential count rate circuit. The detectors are equipped with a pair of balanced filters whose K absorption edges fall on either side of an energy band that includes a characteristic radiation energy of the specific element under investigation.

6 Claims, 5 Drawing Figures

INVENTORS:
IRA LON MORGAN
JOHN R. RHODES
By Mason, Kolehmainen
Rathburn & Wyss
Attorneys

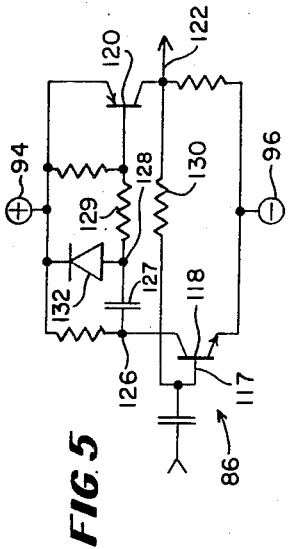
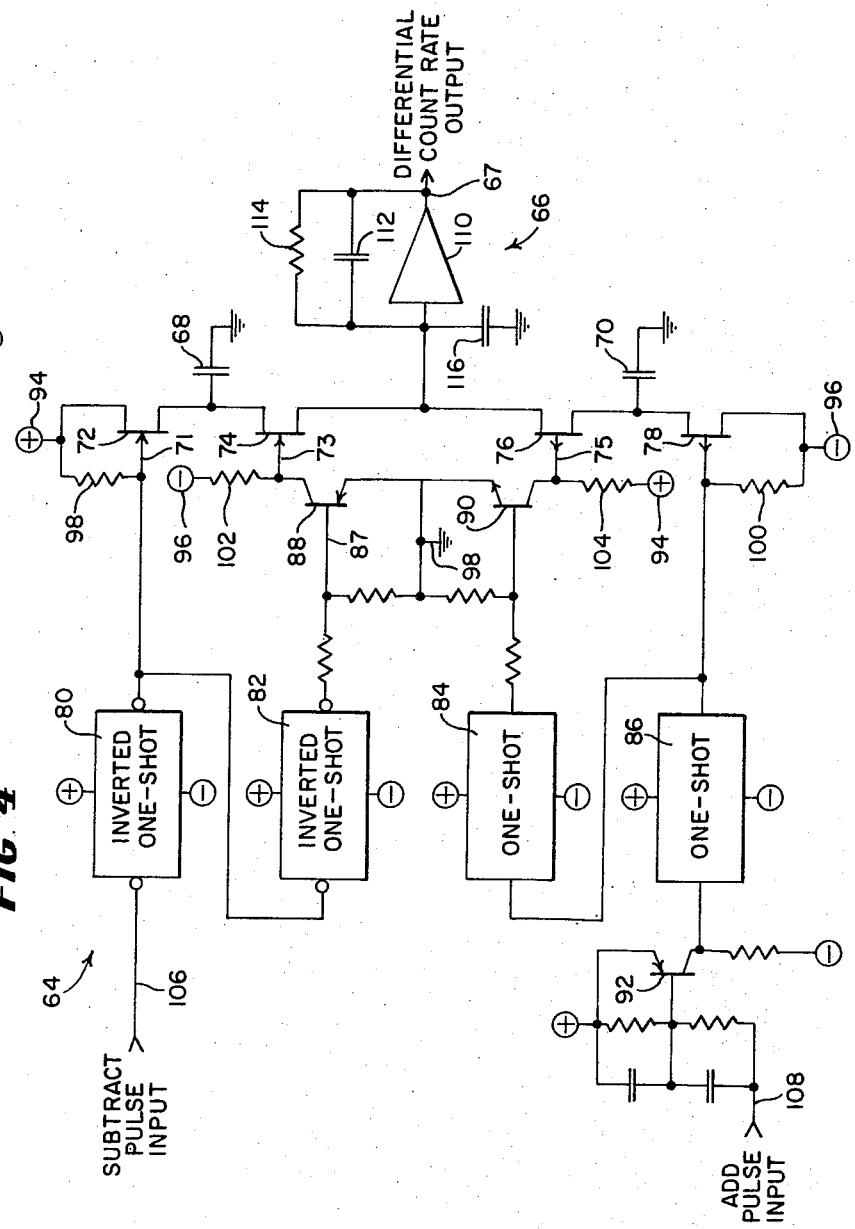
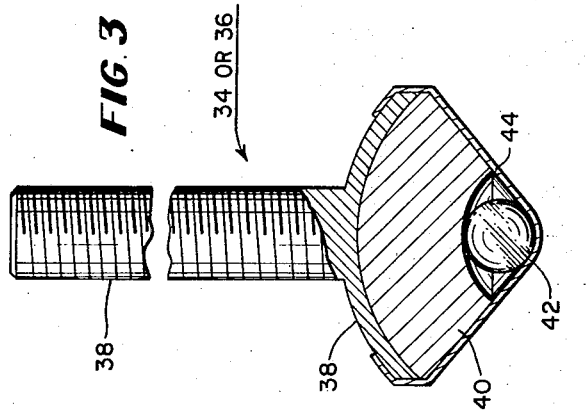
INVENTORS:
IRA LON MORGAN
JOHN R. RHODES
By Mason, Kolehmainen, Rathburn & Wyss
Attorneys

PROBE FOR LOCATING SPECIFIC ELEMENTS IN A BOREHOLE

The present invention relates to borehole logging apparatus, and more particularly to systems that can detect radiations within narrow sections of the soft X-ray energy spectrum.

Many different forms of X-ray well logging apparatus have been used in the past for mineral exploration. The earliest logging devices included a radioactive source that was lowered into a borehole along with some form of energy sensitive ray detector. The quantity of emissions induced by the source was then measured with the detector. By using two detectors having dissimilar detection efficiency versus particle energy curves, later experimenters were able to gain a limited amount of knowledge about the energy of the induced emissions. Examples of such devices are disclosed in U.S. Pat. Nos. 2,475,137 and 2,563,333 issued to Gerhard Herzog. These devices were capable of determining the general energy range of the emissions, but lacked the resolution to carry out detailed spectral analysis, and were incapable of measuring the quantity of emissions falling within a predetermined narrow energy range. In more recent years, with the development of scintillation counters using thallium activated sodium iodide crystals, the crude spectral analyzers of the type described above have been abandoned in favor of devices utilizing a single scintillation counter probe to generate electrical pulses whose energy is approximately proportional to the energy of the detected emissions. By passing the electrical pulses through a suitable single or multiple channel pulse height analyzer, it is possible to obtain a fairly accurate plot of emission intensity versus emission energy. While this method has proved highly satisfactory for hard X-ray emissions having energy contents above 100,000 electron volts, it still does not provide sufficient spectral resolution to allow fluorescent soft X-ray radiations from specific elements to be easily distinguished from one another at energy levels below 100,000 electron volts. Characteristic X-rays emitted by elements 10 to 20 atomic numbers apart can only just be resolved using scintillation pulse height techniques.

A primary object of the present invention is therefore to produce a particular source detector geometry for a well logging device which is able to isolate the characteristic X-rays representing a given element from those elements having almost the same atomic numbers.

Another object of the present invention is to obtain a well logging device that can generate a signal representing the quantity of a particular element that is within the vicinity of the logging device, and that can therefore perform fluorescent spectral analysis within a borehole.

In accordance with the above and many other objects, an embodiment of the present invention comprises a portable well logging apparatus including a small diameter probe which may be lowered into a borehole. The probe includes two sodium iodide, thallium-activated scintillation type photomultiplier particle detectors symmetrically spaced on either side of a radiation source. Gold shields prevent direct source radiation from striking the scintillators. The source is carefully positioned symmetrically between the two scintillators so that the fluorescent emissions which it induces in the borehole surrounding the probe impinge equally upon the two scintillators.

The apparatus is designed to measure the quantity of radiations falling within a predetermined, narrow energy range. Each of the two scintillators is equipped with a thin foil energy filter. Each filter contains a high percentage of a certain element whose K absorption edge lies close to the predetermined narrow energy range. One of these filters includes an element whose K absorption edge falls just below the predetermined energy range, and the second includes an element whose K absorption edge falls just above the predetermined energy range. The thickness of the two filters is carefully adjusted so that they constitute a balanced filter pair, in accordance with the teachings of J.F. Cameron and J.R. Rhodes in the article "Filters For Energy Selection in Radio Isotope X-Ray Techniques." This article appears on pages 387–392 of THE ENCYCLOPEDIA OF X-RAYS AND GAMMA RAYS edited by George L. Clark, published in 1963 by Reinhold Publishing Corporation, New York, New York. The filter pairs are thus balanced so that for all energies outside of the predetermined range both of the filters are equally effective in reducing the number of emissions which strike the scintillator. For all emission energies lying outside the predetermined range, the two scintillators are equally sensitive, and detect the same number of counts. Within the predetermined energy range, however, the two filters differ substantially in their filtering ability. Hence, one of the detectors receives for more counts within the predetermined energy range than does the other. By feeding the output signals from the two detectors into a differential count rate circuit, a signal is generated which is proportional in strength to the number of emissions that occurred having energies within the predetermined range. By selecting filters having K absorption edges which fall on either side of an energy at which a particular element fluoresces, this apparatus can be used to detect the presence of a single element.

The invention, together with other objects and advantages thereof, will best be understood from considering the following detailed description in conjunction with the drawings in which:

FIG. 3 is a partially sectional view of a suitable radioactive source for use in conjunction with the present invention;

FIG. 4 is a partially schematic, partially diagrammatic representation of a differential count rate circuit suitable for use in the well logging apparatus disclosed in FIG. 1; and FIG. 5 is a schematic diagram of a one-shot circuit suitable for use in the differential count rate circuit shown in FIG. 4.

Figure 2:
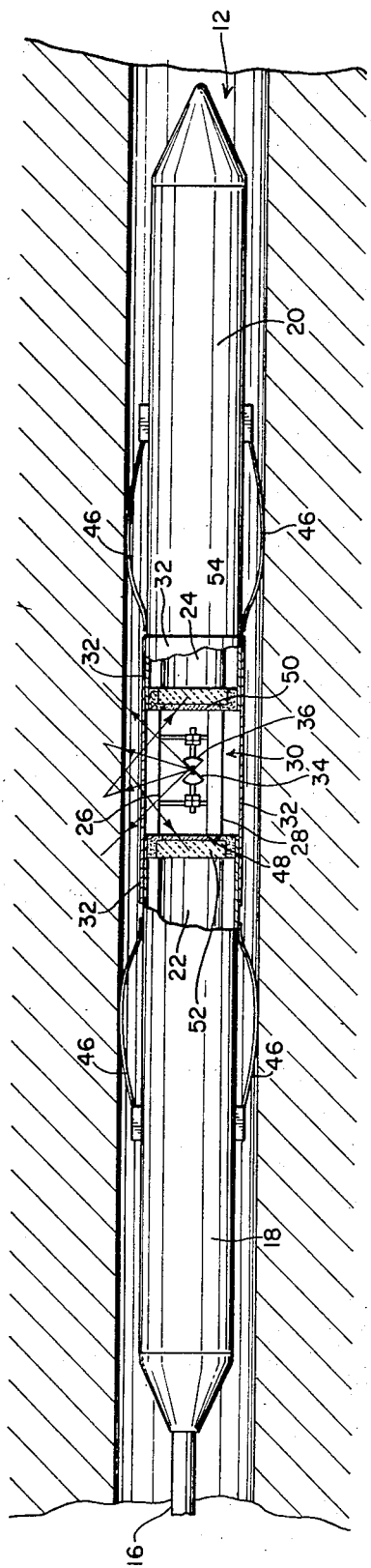
FIG. 2 is an elevational, sectional view of a borehole including a partially sectional representation of a well logging probe designed in accordance with the teachings of the present invention.
Figure 1:
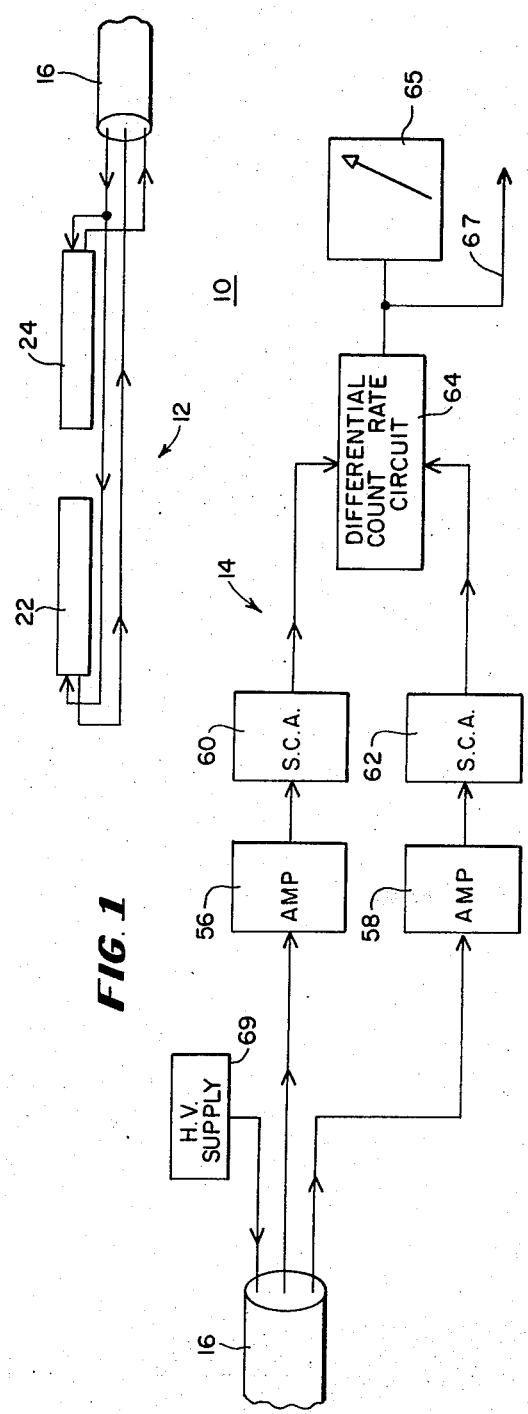
FIG. 1 is a block diagram of a well logging apparatus designed in accordance with the present invention.

Referring now to the drawings, FIG. 1 shows a well logging apparatus 10 designed in accordance with the teachings of the present invention. Basically, the apparatus comprises a probe 12 and an electronic unit 14 which are connected together by a cable 16 of extended length. The probe 12 is shown in more detail in FIG. 2. It comprises basically a pair of cylinders 18 and 20 each containing a photomultiplier tube 22 and 24. The cylinders 18 and 20 are actually jointed by three connective metal straps 26, 28, and 30 (behind strap 28). A 0.01 inch thick mylar sheet 32 is then wrapped around the exterior of the probe 12 to further connect two cylinders 18 and 20 as shown in FIG. 2, and to protect the interior elements of the probe 12 from moisture and abrasion. For high pressure well logging, the sheet 12 can be replaced by a more rigid structure that is still transparent to low energy X-rays. Between the two cylinders 18 and 20 are positioned a pair of radioactive sources 34 and 36. These sources are identical to one another, and are shown in more detail in FIG. 3. Each source comprises a threaded steel support 38, a gold conical radiation shield 40, and a radioactive source 42. The source 42 is attached to the radiation shield 40 by means of epoxy cement, and the resultant structure is covered with an aluminum shield 44 that is anchored to the steel support 38 with epoxy cement. The two radiation sources 34 and 36 are mounted coaxially precisely in the center of the probe 12 so as to just touch one another as shown in FIG. 2. The positions are adjusted so that they supply equal amounts of radiation to the two photomultiplier tubes 22 and 24. The gold shields 40 prevent radiation from passing directly from a source 42 (FIG. 3) to one of the photomultiplier tubes 22 or 24 (FIG. 2). Hence, only secondary fluorescent emissions coming from the borehole reach the two scintillators, as is shown by the arrows in FIG. 2. By centering the two sources 34 and 36 precisely within the probe 12, cylindrical symmetry is achieved, and the probe 12 becomes relatively insensitive to changes in its position within the borehole. For example, if the probe 12 moves towards one surface of the borehole and away from another, radiation from the one surface received by the photomultipliers 22 and 24 increases, but simultaneously radiation from the other surface received by the photomultipliers decreases, thus keeping the count rate relatively constant. To keep the probe 12 centered, springs 46 are mounted on the sides of the probe 12. Cylindrical symmetry also minimizes error due to rotation of the probe 12 within the borehole.

The source 42 (FIG. 3) can be constructed of any suitable radioactive material which emits radiation over the desired range. Three isotopes which have been used successfully in the preferred embodiment are $^{241}$Am (gamma rays, 60 kev., NpL X-rays 11–22 kev.), $^{147}$Pm/Al (Bremsstrahlung 10–100 kev.), and $^{57}$CO (gamma rays, mainly 122 kev.). The photon output required is approximately $3.5 \times 10^7$ to $4 \times 10^7$ (photons/sec over 4 pi). This low photon output is sufficient for use with the high efficiency source-sample detector geometry and non-dispersive energy selection methods employed. By way of comparison, a conventional X-ray tube has an output of about $10^{13}$ photons per second. The low photon output of this source and the gold shield 40 (FIG. 3) make changing sources or adjusting the position of the sources an easy matter. Only a minimum of shielding is required to reduce the already low radiation dose rate to an unmeasurable level. The gold shield 40 allows very little radiation to reach the threaded steel support 38. The localized dose rate at about 1 cm from the emitting side of the source is in the order of 1 to 10 R/hr. The source should only be handled with tweezers to reduce the dose rate to the finger ends.

A pair of balanced filters 48 and 50 are arranged to surround scintillating elements 52 and 54 which are attached to the ends of the photomultipliers 22 and 24. Thus, all radiation from the borehole walls is filtered before it reaches the two scintillating elements. One of these filters 48 has an absorption edge that occurs just below the predetermined range of energy, and the second filter 50 has an absorption edge that occurs just above the predetermined range of energy. For example, if one filter is constructed from Molybdenum (K absorption edge located at 20,002 electron volts) and if the other is constructed from Rhodium (K absorption edge located at 23,224 electron volts), then the resultant apparatus can be used to detect the presence of extremely small quantities of silver within the borehole, because silver emits K X-rays at an energy level of 22,162 electron volts, which falls between the absorption edge energies of Molybdenum and Rhodium.

Referring again to FIG. 1, it can be seen that the output signals from the two scintillators 22 and 24 are fed respectively to amplifiers 56 and 58. These are charge sensitive amplifiers which generate a pulse whose height is proportional to the charge received from the photomultipliers 22 and 24. The output pulses from the amplifiers 56 and 58 are respectively fed through conventional single channel analyzers 60 and 62. The purpose of these analyzers is to eliminate all pulses whose amplitudes indicates that they represent radiations whose energy content does not even come close to the predetermined energy range. In response to pulses from the amplifiers 56 and 58 whose amplitude falls within the proper limits, the single channel analyzers 60 and 62 develop output pulses. These output pulses are fed to the two inputs of a differential count rate circuit 64. The differential count rate circuit 64 calculates the average difference between the frequency of pulses coming from the two single channel analyzers 60 and 62, and generates an output signal that is proportional to this averaged difference. This signal is fed to a meter 65, and can also be fed to a chart recorder or other suitable recording device over a line 67.

A high voltage supply 69 generates the necessary operating potential for the photomultipliers 22 and 24. This supply 69, and the related photomultiplier dynode circuitry, are conventional in design.

The details of the differential count rate circuit 64 are shown in FIG. 4. This circuit 64 includes a charge storage device 66, two charge transfer capacitors 68 and 70, field effect transistor switches 72–78, one-shot circuits 80–86, and transistor inverting amplifiers 88–92. The charge transfer capacitor 68 is connected to a positive potential source 94 by a first N-channel field-effect transistor switch 72, and to the charge integrator 66 by a second N-channel field-effect transistor switch 74. The charge transfer capacitor 70 is similarly connected to a negative potential source 96 by a P-channel field-effect transistor switch 78, and to the charge integrator 66 by a second P-channel field-effect transistor switch 76. Normally resistors 98 and 100 respectively render the switches 72 and 78 conductive, so that the charge transfer capacitor 68 is charged positively and so that the charge transfer capacitor 70 is charged negatively. Resistors 102 and 104 normally render the switches 74 and 76 non-conductive, so that no charge flows into the charge integrator 66.

Assume now that a negative pulse is applied to the subtract pulse input 106 of the circuit 64. This pulse triggers the one-shot 80 and causes the one-shot 80 to apply a negative potential to the gate electrode 71 of the switch 72, thus rendering the switch 72 non-conductive. This same negative output from the one-shot 80 triggers the one-shot 82 and causes it to apply a negative potential to the emitter electrode 87 of the inventor transistor inverting amplifier 88, thus causing the amplifier 88 to connect a ground level potential source 98 to the gate electrode 73 of the switch 74. This renders the switch 74 conductive and creates a discharge path from the capacitor 68 into the charge integrator 66. In a very short interval of time, the charge previously stored in the capacitor 68 is transferred into the charge integrator 66. The circuit time constants are chosen such that the one-shot 82 has a shorter time constant than the one-shot 80, and therefore the switch 74 is rendered non-conductive before the field-effect transistor 72 is again rendered conductive. Thus, after an appropriately short interval the charge transfer capacitor 68 is disconnected from the charge storage device 66, and shortly thereafter it is reconnected to the positive source of the potential 94 by the gate 72. In this manner, a small quantum of positive charge is applied to the charge integrator 66 each time a negative pulse is applied to the subtract pulse input 106 of the circuit 64.

When a negative pulse is applied to the add pulse input 108 of the circuit 64, a similar operation takes place, and the charge transfer capacitor 70 transfers a negative charge quantum to the charge integrator 66. The negative pulse applied to the input 108 is inverted by the inverting transistor amplifier 92 so that it can trigger a one-shot 86. The one-shot 86 generates a positive level signal which renders the P-channel switch 78 non-conductive and which also triggers the one-shot circuit 84. The one-shot circuit 84 generates a positive level signal which causes the inverting transistor amplifier 90 to connect the gate electrode 75 of the switch 76 to ground, thus rendering the switch 76 conductive. In this manner, the charge stored in the capacitor 70 is transferred to the charge integrator 66. As in the case of the one-shots 80 and 82, the one-shot 84 is given a shorter time constant than the one-shot 86 so that the switch 76 becomes non-conductive before the switch 78 becomes conductive. This is necessary to prevent the two switches from conducting simultaneously and thereby connecting the negative potential source 96 directly to the charge integrator 66.

The charge integrator 66 is an integrating operational amplifier circuit including a high gain amplifier 110 by-passed by an integrating capacitor 112, and also bypassed by a resistor 114. The resistor 114 discharges the capacitor 112 as time passes, and thus converts the output from a charge integral into a measurement of the rate at which the charge is added to the input of the charge integrator 66. An additional capacitor 116 connects the input to the charge integrator 66 to ground and smooths the operation of the circuit 64. The output signal 67 generated by this circuit is called the differential count rate output and can either be applied to a suitable meter, as shown in FIG. 1, or else it can be fed to some other external device.

The differential count rate circuit 64 has a number of advantages which are not shown by circuits used previously. First, the use of field effect transistor switches rather than diode switches in the charge transfer circuitry eliminates the usual temperature drift problems inherent in junction diode switches. Since the switching channels are each made of a single material and contain no junctions, no temperature dependent junction potentials are developed within the channels. Additionally, the field-effect transistor switches do not require any gate current, and are therefore ideally suited for use in a battery powered, portable piece of equipment. In this connection, it is noteworthy that all bipolar transistors within the differential count rate circuit 64 are in a non-conductive state when the circuit 64 is not receiving input pulses. Hence, the standby current required to operate the circuit 64 is extremely small. Finally, each field-effect transistor switch in the circuit 64 performs the same tasks that previously required a combination of transistors and diodes. Their use thus greatly simplifies the circuit, and makes it less expensive and more reliable.

FIG. 5 shows the details of the typical one-shot circuit 86. Normally both of the transistors 118 and 120 are non-conductive, and the output signal 122 is negative. In response to a positive pulse applied to the input 124, the transistor 118 becomes conductive and pulls a collector node 126 negative. The capacitor 127, which connects to this node 126, pulls the node 128 negative, and current flow through a resistor 129 causes the transistor 120 to conduct. The transistor 120 then connects the output node 122 to the positive node 94 and thus generates a positive output signal at the node 122. The resistor 130 feeds this positive output signal back to the base 117 of the transistor 118 and clamps the one-shot 86 in this state for a time that is determined by the values of the capacitor 127 and of the resistor 129. When the capacitor 127 has sufficiently discharged, the transistor 120 again becomes non-conductive and the output node 122 returns to a negative potential level. This cuts off the positive current flow through the resistor 130, so the transistor 118 also becomes non-conductive. A diode 132 speeds the discharge of the capacitor 127 so that within the very short interval the one-shot 86 is ready to receive another positive pulse. The one-shot circuits 84 and 86 are identical. The inverted one-shots 80 and 82 are basically identical to the one-shot 84, but are designed to operate with inverted input and output signals. In the preferred embodiment, the one-shots 80 and 82 are constructed in accordance with the schematic diagram shown in FIG. 5 but modified by the interchanging of the supply nodes 94 and 96, by the interchanging of the transistors 118 and 120, and by the reversal of the diode 132.

Although the present invention has been described with reference to an illustrative embodiment thereof, it should be understood that numerous other modifications and changes will readily occur to those skilled in the art and it is therefore intended by the appended claims to cover all such modifications and changes that will fall within the true spirit and scope of the invention.

What is claimed as new and desired to be secured by Letters Patent of the United States is:

1. A borehole logging probe, comprising:
   an essentially point source of low energy radiation for irradiating the borehole and for inducing low energy fluorescence in the borehole,
   first and second radiation detection devices mounted symmetrically on opposite sides of said source, said source and said radiation detection devices being located on the same axis and being arranged so as to be cylindrically symmetric with respect to said axis,
   means for adjusting the relative position of the source with respect to the radiation detection devices to facilitate balancing the outputs of the detection devices,
   radiation shields positioned between said source and said radiation detection devices, and
   first and second filters constructed from materials whose K absorption edges define an energy band and which are substantially balanced outside of said energy band respectively positioned between said first and second radiation detection devices and the irradiated portion of the borehole.

2. A borehole logging probe in accordance with claim 1, wherein said radiation detection devices are photomultiplier devices equipped with scintillation type detectors, and wherein pulse height analyzing circuitry is connected to the output of the detection devices, said pulse height analyzing circuitry blocking the passage of all pulses whose energy levels are not close to the energy band defined by the K absorption edges of the balanced filters.

3. A borehole logging probe in accordance with claim 1, wherein the source and the radiation detection devices are protected by a cylindrical X-ray transparent window.

4. A borehole logging probe, comprising a pair of radiation source assemblies, each of said assemblies comprising a radiation source mounted on the end of a conical radiation shield, means for positioning said radiation source assemblies along the central axis of the probe with said sources adjacent to one another, first and second radiation detection devices mounted symmetrically on opposite sides of said radiation source assemblies, first and second balanced filters respectively positioned in relation to said radiation detection devices so as to produce a difference in their sensitivities over an energy range which includes the K absorption edges of said balanced filters, said radiation source assemblies being adjustable along said central axis of the probe so that the outputs of said first and second radiation devices may be equalized.

5. A borehole logging probe comprising two individual sources of radiation, first and second radiation detection devices mounted symmetrically on opposite sides of said sources, a pair of radiation shields each supporting one of said sources and positioned between said sources and radiation detection devices so that said sources, shields, and radiation detection devices are located on the same axis and are arranged to be cylindrically symmetric with respect to said axis, and first and second balanced filters respectively positioned in relation to said first and second radiation detection devices so as to produce a difference in their sensitivity over an energy range defined by the K absorption edges of said balanced filters.

6. A borehole logging probe in accordance with claim 5, wherein each of said sources of radiation is mounted upon a gold radiation shield, each of said shields being fastened to a threaded support, the support being positioned on the opposite side of the shield from the associated source, whereby each source assembly can be readily adjusted or replaced.

* * * * *